US008411795B2

(12) United States Patent
Foo

(10) Patent No.: US 8,411,795 B2
(45) Date of Patent: Apr. 2, 2013

(54) HIGH POWER HIGH LINEARITY DIGITAL PHASE SHIFTER

(75) Inventor: Senglee Foo, Irvine, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 936 days.

(21) Appl. No.: 12/284,123

(22) Filed: Sep. 18, 2008

(65) Prior Publication Data

US 2009/0074109 A1 Mar. 19, 2009

Related U.S. Application Data

(60) Provisional application No. 60/994,467, filed on Sep. 19, 2007.

(51) Int. Cl.
*H04L 27/20* (2006.01)

(52) U.S. Cl. .......................................................... 375/308

(58) Field of Classification Search .................. 333/109, 333/164, 156, 160, 139, 18; 330/302, 303; 375/300, 342, 349; 343/844, 818; 327/237, 327/252

See application file for complete search history.

(56) References Cited

U.S. PATENT DOCUMENTS

| | | | | |
|---|---|---|---|---|
| 4,751,453 | A * | 6/1988 | Foti | 323/212 |
| 5,489,875 | A * | 2/1996 | Cavers | 330/151 |
| 6,587,017 | B1 * | 7/2003 | Sheng et al. | 333/139 |
| 7,053,732 | B2 * | 5/2006 | Zhou | 333/156 |
| 7,586,387 | B2 * | 9/2009 | Van Delden | 333/101 |
| 2009/0015346 | A1 * | 1/2009 | Van Delden | 333/101 |

OTHER PUBLICATIONS

Hall, "A 25 Watt RF MEM-Tuned VHF Bandpass Filter", Jun. 2003, Microwave Symposium digest, 2003 IEEE MTT-s International, vo. 1, pp. 503-506.*

Hall et al., A 25 Watt RF MEM-Tuned VHF Bandpass filter, Jun. 2003, IEEE.*

* cited by examiner

*Primary Examiner* — Daniel Washburn
*Assistant Examiner* — Wednel Cadeau
(74) *Attorney, Agent, or Firm* — OC Patent Law Group

(57) ABSTRACT

A digital phase shifter suitable for high power RF applications is disclosed. A plurality of MEMs switches selectively couple delay lines into the RF signal path providing adjustable phase shift under digital control. 90 degree hybrid combiners on either side of the MEMs switches allow two signal paths to be used in combination to provide a desired number of phase shift steps with a reduced number of delay lines and switches and with lower power level on each path.

3 Claims, 3 Drawing Sheets

HIGH POWER HIGH LINEARITY DIGITAL PHASE SHIFTER

RELATED APPLICATION INFORMATION

The present application claims priority under 35 USC section 119(e) to U.S. provisional patent application Ser. No. 60/994,467 filed Sep. 19, 2007, the disclosure of which is incorporated herein by reference in its entirety.

BACKGROUND OF THE INVENTION

1. Field of the Invention

The present invention relates in general to RF systems and components. More particularly the invention is directed to RF phase shifters and related methods.

2. Description of the Prior Art and Related Background Information

In various RF applications precise control of the phase of the RF signals is important. For example, in RF antenna arrays precise phase control is necessary to ensure proper phase of radiated signals for beam control applications, such as beam steering, beam tilt control and beam forming. In such applications the RF signal to be phase shifted is relatively high power and not suitable for control by conventional low power digital electronics components. Also, in applications where the radiated signal is a communications signal it is undesirable to introduce distortion which can be caused by nonlinear effects from the phase shift circuitry. These constraints severely limit the phase shift components which can be employed and typically relatively bulky and expensive mechanical phase shifters are employed.

Therefore, a need exists for an adjustable phase shifter suitable for high power RF applications such as antenna arrays.

SUMMARY OF THE INVENTION

In a first aspect the present invention provides a digitally controlled phase shifter comprising an input receiving an RF input signal and a first coupler receiving the RF input signal and splitting the signal into first and second signals having a predetermined phase relation. The phase shifter further comprises a first delay path receiving the first signal and providing a first delayed signal, the first delay path comprising a first plurality of delay lines having differing delays and one or more first MEM switches responsive to a first control signal for selecting one of the first plurality of delay lines in response to the first control signal. The phase shifter further comprises a second delay path receiving the second signal and providing a second delayed signal, the second delay path comprising a second plurality of delay lines having differing delays and one or more second MEM switches responsive to a second control signal for selecting one of the second plurality of delay lines in response to the second control signal. The phase shifter further comprises a second coupler receiving the first and second delayed signals and combining the signals with a predetermined phase relation to provide a phase shifted output signal and an output receiving the phase shifted output signal.

In a preferred embodiment of the digitally controlled phase shifter the first coupler comprises a 90 degree hybrid coupler and the second coupler comprises a second 90 degree hybrid coupler and a combiner. The first delay path may comprise N delay lines and provides N delayed signals, where N is an integer and the second delay path may comprise M delay lines and provides M delayed signals, where M is an integer. The phase shifted output signal may be altered in N×M discrete steps in response to the control signals. For example, N may be four and M two and eight phase shift steps are provided.

The discrete steps may provide respective phase shift delays from 0 to 90 degrees. The RF input signal may have a relatively high power level, for example about 30 Watts or greater, and the RF input signal power level is split along the first and second delay paths. The second plurality of delay lines preferably includes a reference delay line and the first plurality of delay lines have incrementally varying delays referenced to the delay of the reference delay line.

In another aspect the present invention provides a digitally controlled phase shifter comprising an input receiving an RF input signal and a first 90 degree hybrid coupler receiving the RF input signal and splitting the signal into first and second signals having a 90 degree phase difference. The phase shifter further comprises a first delay path receiving the first signal and providing a first delayed signal, the first delay path comprising a first single pole multi-throw MEM switch responsive to a first digital control signal, a second single pole multi-throw MEM switch responsive to a second digital control signal, and a first plurality of delay lines having differing delays coupled between the first and second single pole multi-throw MEM switches, wherein the first and second single pole multi-throw MEM switches select one of the first plurality of delay lines in response to the first and second control signals. The phase shifter further comprises a second delay path receiving the second signal and providing a second delayed signal, the second delay path comprising a third single pole multi-throw MEM switch responsive to a third digital control signal, a fourth single pole multi-throw MEM switch responsive to a fourth digital control signal, and a second plurality of delay lines having differing delays coupled between the third and fourth single pole multi-throw MEM switches, wherein the third and fourth single pole multi-throw MEM switches select one of the second plurality of delay lines in response to the first and second control signals. The phase shifter further comprises a second 90 degree hybrid coupler receiving the first and second delayed signals and providing first and second delayed output signals having a 90 degree phase difference, a combiner receiving the first and second delayed output signals and combining them to provide a phase shifted output signal, and an output receiving the phase shifted output signal.

In one preferred embodiment of the digitally controlled phase shifter the first and second single pole multi-throw MEM switches may each comprise a single pole quad throw MEM switch and the first plurality of delay lines comprises four delay lines with four different delays. The third and fourth single pole multi-throw MEM switches may each comprise a single pole double throw MEM switch and the second plurality of delay lines comprises two delay lines with two different delays and the digitally controlled phase shifted output signal may be provided in eight discrete steps of different delay. The digitally controlled phase shifter may further comprise a control circuit receiving one or more phase shift control signals and outputting the first, second, third and fourth digital control signals to the first, second, third and fourth single pole multi-throw MEM switches. In one embodiment the control circuit may comprise input control logic and a MEM switch driver circuit, wherein the input control logic is coupled to receive the phase control signals and provides digital inputs to the MEM switch driver circuit.

In another aspect the present invention provides a method for providing a controlled delay to an RF input signal. The method comprises receiving an RF input signal and splitting the RF input signal into first and second signals having a predetermined phase relation. The method further comprises delaying the first signal by a controlled amount responsive to a first digital control signal and providing a first delayed signal by switching the first signal onto one of a first plurality of delay lines having differing delays employing one or more MEM switches responsive to the first digital control signal.

The method further comprises delaying the second signal by a controlled amount responsive to a second digital control signal and providing a second delayed signal by switching the second signal onto one of a second plurality of delay lines having differing delays employing one or more MEM switches responsive to the second digital control signal. The method further comprises receiving the first and second delayed signals and combining the signals with a predetermined phase relation to provide a phase shifted output signal and outputting the phase shifted output signal.

In one preferred embodiment of the method for providing a controlled delay to an RF input signal the predetermined phase relation is a 90 degree phase difference. The second plurality of delay lines preferably includes a reference delay line and the first plurality of delay lines have incrementally varying delays referenced to the delay of the reference delay line. The phase shifted output signal may be controlled in plural delay steps responsive to the digital control signals in a range from 0 to 90 degrees. The first plurality of delay lines may comprise N delay lines and the second plurality of delay lines may comprise M delay lines and the phase shifted output signal is controlled in N×M plural delay steps responsive to the digital control signals. As one example, N is four and M is two and eight phase shift steps are provided.

Further features and advantages of the present invention will be appreciated from the following detailed description of the invention.

DETAILED DESCRIPTION OF THE INVENTION

Figure 1:
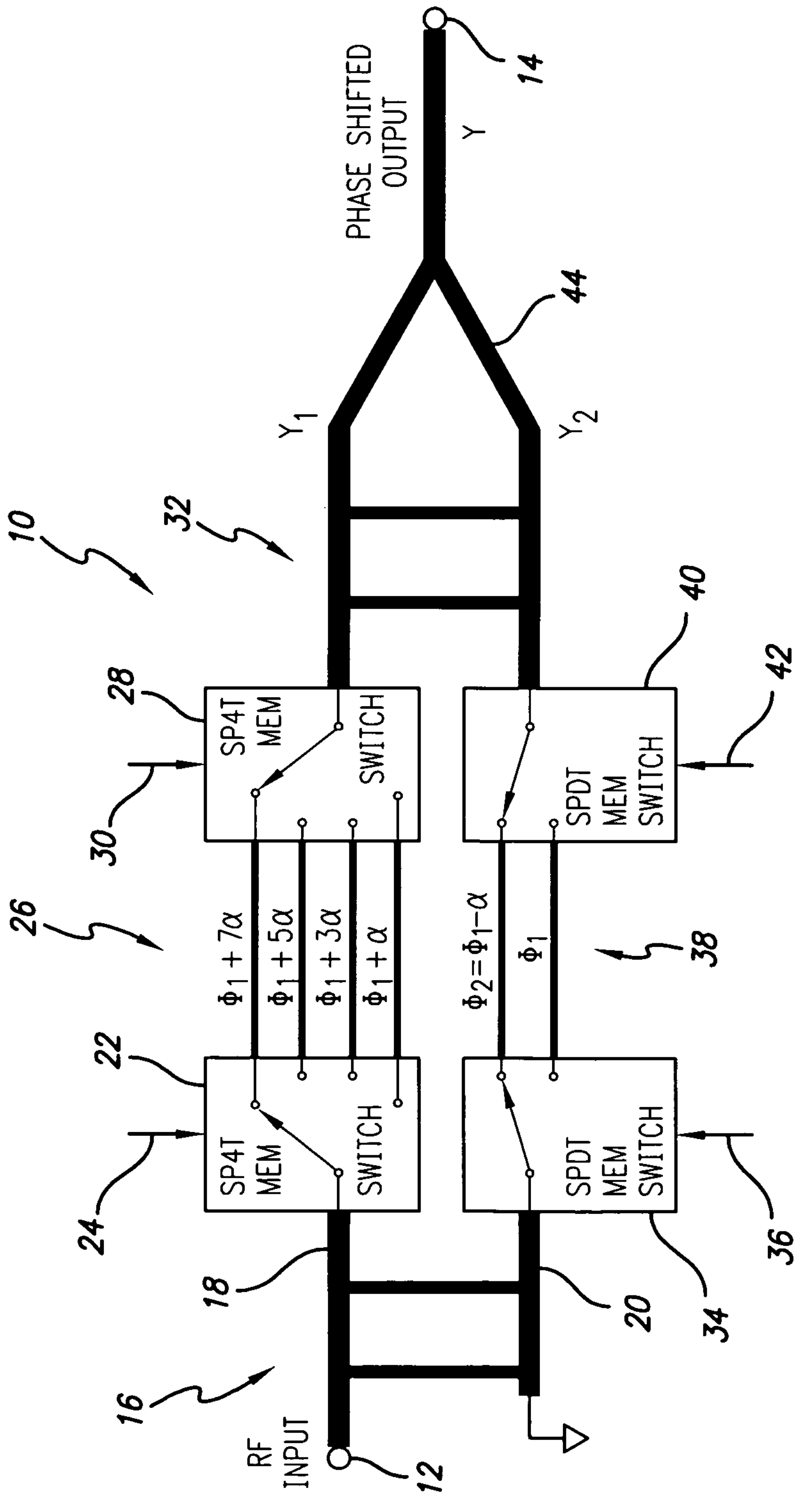
FIG. 1 is a schematic drawing of a phase shifter in accordance with an illustrative embodiment of the invention.

Referring to FIG. 1 an illustrative non-limiting embodiment of the phase shifter of the invention is shown suitable for explaining the principles of operation.

As shown in FIG. 1, the phase shifter 10 receives an RF input signal at input port 12 and provides a delayed phase shifted output at output port 14. The RF signal may be a relatively high power, high frequency signal such as provided in an antenna array used for cellular communications. For example, power levels of 30 Watts or more may be typical and the frequency range may be in any of the well known cellular communications bands. The RF input signal is provided to a first 90 degree hybrid coupler 16 which splits the signal into two 90 degree shifted signals which are provided along a first delay path 18 and a second reference delay path 20.

Considering the first delay signal path 18, the signal is provided to a digitally controlled delay circuit comprising a first Micro-Electro-Mechanical (MEM) switch 22, separate delay lines 26, and second MEM switch 28. In the illustrated embodiment, four delay lines 26 are provided having different delays providing varying phase shifts as schematically shown and as discussed in more detail below. First MEM switch 22 and second MEM switch 28 are preferably Single Pole quad (4) Throw (SP4T) switches controlled by digital control signals 24, 30, respectively, to select one of the four delay lines 26. MEM switches 22, 28 are preferably high power linear MEM switches of a type known in the art and which are commercially available. (As will be appreciated from the following description the two switches operate together to select or switch the signal along a selected delay line and accordingly the term switch as used herein may refer to this collective action and suitable structure for achieving this whether employing one, two or more separate switch component structures.)

In the second reference delay signal path 20, the output of hybrid coupler 16 is provided to a reference delay circuit comprising MEM switch 34, separate delay lines 38, and MEM switch 40. In the illustrated embodiment, two reference delay lines 38 are provided providing two different delays and corresponding varying phase shifts to the RF signal, as schematically shown and as discussed in more detail below. MEM switch 34 and MEM switch 40 are preferably high power linear Single Pole Double Throw (SPDT) MEM switches which receive digital control signals 36, 42, respectively, to selectively provide the reference RF signal along one of delay lines 38.

The outputs of switches 28 and 40 are provided to a second 90 degree hybrid combiner 32 which outputs signals $Y_1$ and $Y_2$, having a phase relation as discussed below. Signals $Y_1$ and $Y_2$, are combined at combiner 44 and the phase shifted combined signal Y is output at output port 14.

Next the theory of operation will be described in more detail. High power capability is achieved by the combination of high power MEM switches 22, 28, 34, 40 and vectorial summation of two orthogonal RF signals along paths 18, 20. Consider the $\phi_1$ path and assume a reference delay:

$$\varphi = \phi_1 + \frac{m\alpha}{2},$$

where m=odd number. Then, transmission phase of the two paths in terms of the reference delay are:

$$\phi_1 = \varphi - \frac{m\alpha}{2}$$

$$\beta_m = \phi_1 + m\alpha = \varphi + \frac{m\alpha}{2}$$

where m=odd number.

Then the outputs of the second 90 deg hybrid are:

$$Y_1 = \frac{A}{2}\left[\mathrm{Sin}\left(\frac{m\alpha}{2} + \varpi\right) - \mathrm{Sin}\left(\frac{m\alpha}{2} - \varpi\right)\right] = \frac{A}{2}\mathrm{Sin}\left(\frac{m\alpha}{2}\right)\mathrm{Cos}(\varpi)$$

$$Y_2 = \frac{A}{2}\left[\mathrm{Sin}\left(\frac{m\alpha}{2} + \omega\right) + \mathrm{Sin}\left(\frac{m\alpha}{2} - \varpi\right)\right] = \frac{A}{2}\mathrm{Cos}\left(\frac{m\alpha}{2}\right)\mathrm{Sin}(\varpi)$$

and the combined output is:

$$Y = Y_1 + Y_2 = A * \mathrm{Sin}\left(\frac{m\alpha}{2} + \varpi\right)$$

where m=odd number.

Similarly, when the reference path is switched to $\phi_2 = \phi_1 - \alpha$ $$Y = Y_1 + Y_2 = A * \mathrm{Sin}\left(\frac{(m+1)\alpha}{2} + \varpi\right)$$

where m=odd number.

Therefore an adjustable phase shift may be provided at a step of α/2 for 2×4=8 steps. Therefore, as one example, 8 deg tilt angles can be provided, at 1 deg step. A total of 16 steps can be achieved by using 4 SP4T MEM switches.

This basic configuration is able to provide up to 0-90 deg of phase shift at full frequency bandwidth. Larger phase shifts at interval of n180±(0-90 deg) are also possible at reduced bandwidth. Also as noted above, high power capability is provided by splitting signal power along the two paths.

Figure 2:
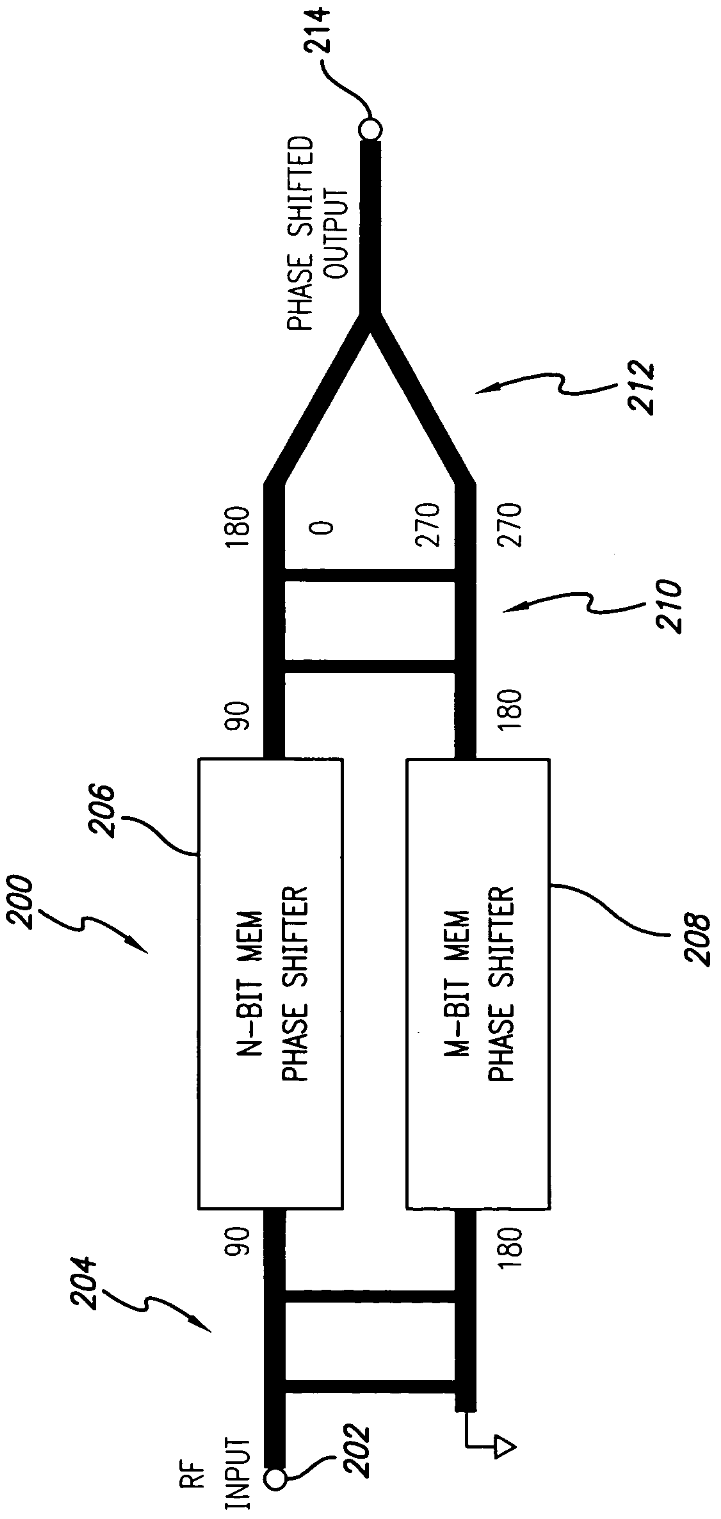
FIG. 2 is a block schematic drawing of a dual path phase shifter in accordance with an alternate embodiment of the invention.

Next, referring to FIG. 2 a block schematic drawing of a more general implementation 200 of the digitally controlled phase shifter of the invention is shown. As in the embodiment of FIG. 1 an RF input signal is provided at RF input port 202 and then to a first 90 deg hybrid combiner 204 which splits the signal on two orthogonal paths. These two signals are provided to an N bit MEM phase shifter 206 and an M bit MEM phase shifter 208 each employing digitally controlled MEM switches, preferably two single pole multi-throw MEM switches in each, coupled to plural delay lines and employing the above described theory of operation. The outputs of N bit MEM phase shifter 206 and M bit MEM phase shifter 208 are provided to second hybrid combiner 210 and then combined at combiner 212 to provide a phase shifted output at RF output port 214. From the foregoing description of the theory of operation in relation to FIG. 1 it will be appreciated that the phase shifter of FIG. 2 can provide digitally controlled phase shifts in N×M separate steps. Also, as before a high power RF signal is split on two paths each employing high power MEMs switches allowing linear operation at high input RF power levels.

Figure 3:
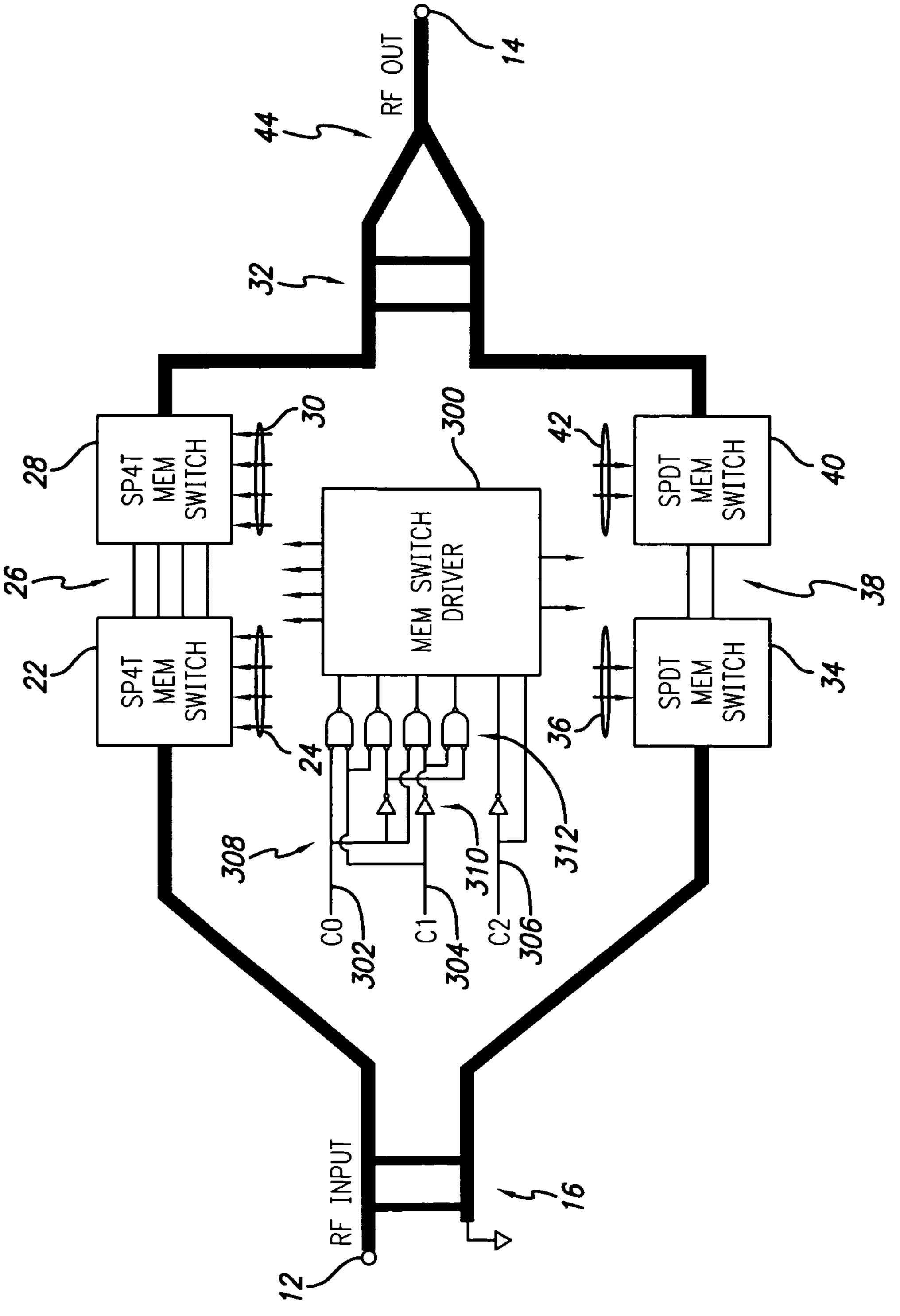
FIG. 3 is a detailed schematic drawing of a phase shifter and control circuit in accordance with an illustrative embodiment of the invention.

Referring to FIG. 3 a detailed schematic drawing of a phase shifter and control circuit in accordance with an illustrative embodiment of the invention is shown. The basic phase shifter elements in FIG. 3 correspond to those in FIG. 1 and need not be described again. The embodiment of FIG. 3 illustrates a simple control circuit for providing digital control signals to the switches 22, 28, 34 and 40 in response to phase shift control signals C0, C1 and C2 which may be provided from a controller designed for the particular application, such as a beam controller for an antenna array application. The control circuit employs a MEM switch driver 300 which receives the control signals C0, C1 and C2 along lines 302, 304, 306 via digital input logic circuit 308 including inverters 310 and NAND gates 312 coupled as illustrated. MEM switch driver 300 receives the digital inputs from logic circuit 308 and converts them to MEM control signals 24, 30, 36 and 42 which switch the MEMs as described above in relation to FIG. 1. Therefore, it will be appreciated the phase shifter of the invention may be digitally controlled with a simple control circuit.

Although the present invention has been described in specific embodiments it will be appreciated by those skilled in the art that these are not limiting in nature and a variety of variations may be made within the scope of the invention.

What is claimed is:

1. A digitally controlled phase shifter, comprising:

an input receiving an RF input signal;

a first 90 degree hybrid coupler receiving the RF input signal and splitting the signal into first and second signals having a 90 degree phase difference;

a first delay path receiving the first signal and providing a first delayed signal, comprising a first single pole multi-throw Micro-Electro-Mechanical switch responsive to a first digital control signal, a second single pole multi-throw Micro-Electro-Mechanical switch responsive to a second digital control signal, and a first plurality of delay lines having differing delays coupled between said first and second single pole multi-throw Micro-Electro-Mechanical switches, wherein said first and second single pole multi-throw Micro-Electro-Mechanical switches select one of said first plurality of delay lines in response to said first and second control signals;

a second delay path receiving the second signal and providing a second delayed signal, comprising a third single pole multi-throw Micro-Electro-Mechanical switch responsive to a third digital control signal, a fourth single pole multi-throw Micro-Electro-Mechanical switch responsive to a fourth digital control signal, and a second plurality of delay lines having differing delays coupled between said third and fourth single pole multi-throw Micro-Electro-Mechanical switches, wherein said third and fourth single pole multi-throw Micro-Electro-Mechanical switches select one of said second plurality of delay lines in response to said first and second control signals;

a second 90 degree hybrid coupler receiving the first and second delayed signals and providing first and second delayed output signals having a 90 degree phase difference;

a combiner receiving the first and second delayed output signals and combining them to provide a phase shifted output signal;

an output receiving the phase shifted output signal; and a control circuit receiving one or more phase shift control signals and outputting said first, second, third and fourth digital control signals to said first, second, third and fourth single pole multi-throw Micro-Electro-Mechanical switches, wherein said control circuit comprises input control logic and a Micro-Electro-Mechanical switch driver circuit, wherein said input control logic is coupled to receive said phase control signals and provides digital inputs to said Micro-Electro-Mechanical switch driver circuit.

2. A digitally controlled phase shifter as set out in claim 1, wherein said first and second single pole multi-throw Micro-Electro-Mechanical switches each comprise a single pole quad throw Micro-Electro-Mechanical switch and wherein said first plurality of delay lines comprise four delay lines with four different delays.

3. A digitally controlled phase shifter as set out in claim 2, wherein said third and fourth single pole multi-throw Micro-Electro-Mechanical switches each comprise a single pole double throw Micro-Electro-Mechanical switch and wherein said second plurality of delay lines comprise two delay lines with two different delays and wherein said digitally controlled phase shifted output signal is provided in eight discrete steps of different delay.

* * * * *